March 8, 1966 J. R. V. DOLPHIN 3,239,022
INDUSTRIAL TRUCKS PROVIDED WITH AIR-LIFT CASTORS
Filed Feb. 6, 1962 2 Sheets-Sheet 1

March 8, 1966  J. R. V. DOLPHIN  3,239,022
INDUSTRIAL TRUCKS PROVIDED WITH AIR-LIFT CASTORS
Filed Feb. 6, 1962  2 Sheets-Sheet 2
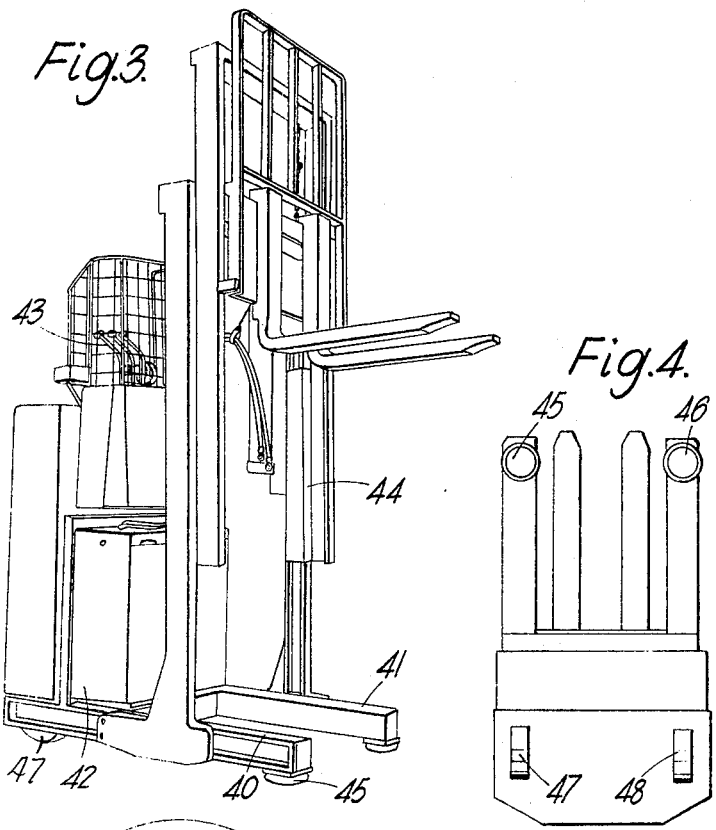
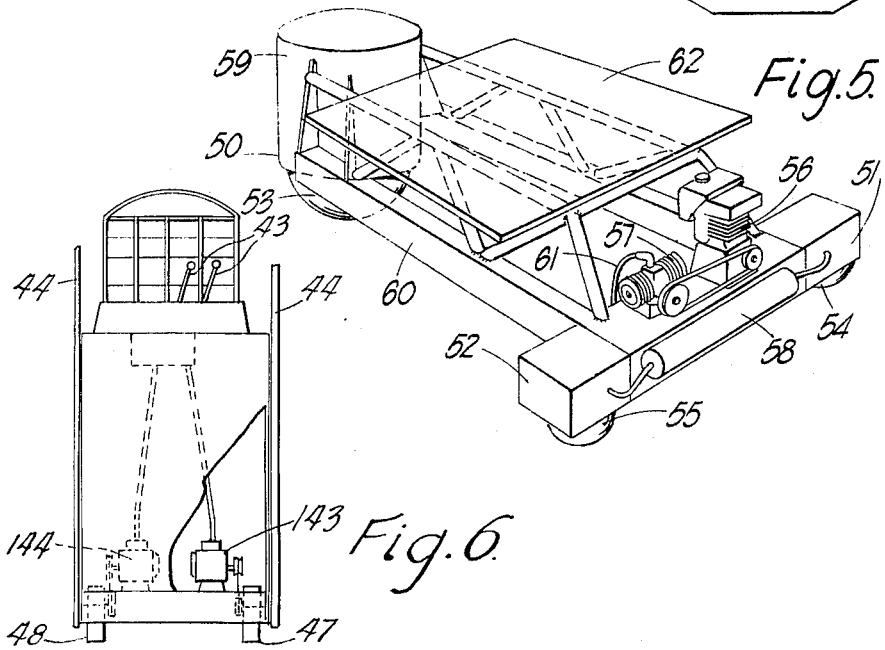

3,239,022
INDUSTRIAL TRUCKS PROVIDED WITH
AIR-LIFT CASTORS
John Robert Vernon Dolphin, Basingstoke, England, assignor to Lansing Bagnall Limited, Basingstoke, England, a British company
Filed Feb. 6, 1962, Ser. No. 171,441
Claims priority, application Great Britain, May 16, 1961, 17,801/61
1 Claim. (Cl. 180—7)

The invention comprises improvements in or relating to supporting devices for industrial trucks.

It is well-known in industrial trucks to have some of the wheel-supports in the form of propelling wheels which can, if desired, be steered and other wheels in the form of castor wheels, which follow the movement set by the steering and propelling wheels. Castor wheels however, require a definite lateral force to cause them to change their orientation and the heavier the load on the truck, the greater this force and, in consequence, the greater the reluctance of the truck to follow exactly the course set by the operator. It would be a great advantage if a more frictionless support could be provided which would not impose any lateral resistance to movement in a desired direction.

According to one aspect of the invention a foot for supporting an industrial truck or part thereof has a hollow underside with a rim facing the ground around the hollow portion and an air pressure-supply-to the hollow interior so that the air pressure can lift the foot and support it close to the ground but with little or no contact pressure upon it, so permitting it to move with minimum friction resistance in any desired direction. A foot, such as has just been described, may be referred to as an "air-lift-foot." Preferably, the junction between the rim and the ground is partially sealed against air leaks by a flexible seal of felt, sponge rubber, foam plastic or the like attached to the rim.

According to another aspect of the invention a foot for supporting an industrial truck or part thereof comprises a housing having a recess in its lower end with a surrounding rim, an air pressure supply to the housing and a ground engaging ball received in the recess and fitting the rim so that when pressure is supplied to the housing the load of the truck on the foot is borne by an air film between the ball and the housing and the ball can roll freely on the ground as can a ball castor. Preferably the ball is a hollow steel ball which may be covered with a thin layer of hard plastic material. Preferably the rim of the housing is provided with a sealing lip of flexible material such as felt, sponge rubber, foam plastic or the like. There may be a ring of brushes around the underside of the rim to rub off dirt and grit and prevent them entering the housing.

The invention includes an industrial truck having one or more air lift feet as described above which is preferably provided with a reservoir for pressurised air associated directly with each foot so as to supply air quickly to the foot to build up pressure in the event of a sudden leakage of pressure.

The following is a description by way of example of several constructions in accordance with the invention, reference being made to the following drawings in which:

FIGURE 3 is a perspective of an industrial reach truck incorporating air lift feet, FIGURE 4 is a diagrammatic plan of the truck shown in FIGURE 3 viewed from underneath, FIGURE 5 is a perspective of a truck incorporating three air-lift-foot castors, and, FIGURE 6 is a rear elevation of the truck of FIGURES 3 and 4.

Figure 1:
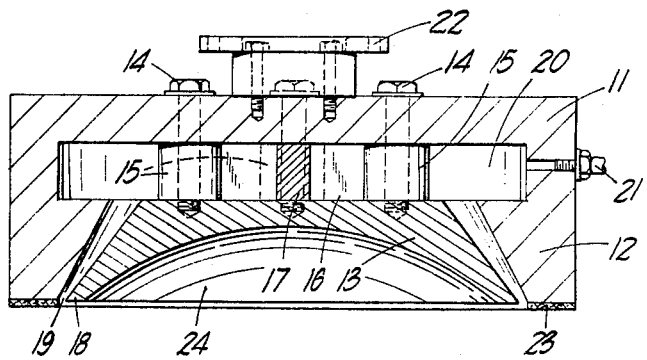
FIGURE 1 is a section through an air-lift-foot.

Referring to FIGURE 1 the air-lift-foot comprises a circular casing 11 closed at the top and with a circular opening in its lower end formed by a downwardly dependant circular wall 12. A mounting flange 22 is bolted to the top of the casing 11. A bell shaped member 13 is mounted in the opening of the casing 11 by means of four bolts 14 which pass through spacers 15 which are joined together by webs 16, 17. The rim 18 of the bell shaped member 13 is close to the inner edge of the wall 12 to form an annular orifice 19. There is a felt seal 23 around the lower edge of the wall 12.

There is a reservoir 20 for compressed air between the top of the casing and the bell shaped member, which reservoir is supplied with compressed air through a supply line 21. The underside 24 of the bell 13 also acts as a reservoir as will be hereinafter described.

In operation with the foot resting on a level surface such as a concrete floor compressed air is supplied from the line 21. Air is forced down through the orifice 19 and pressure builds up under the foot as air leaks very slowly, or even not at all, past the felt seal 23. When the upward force on the foot due to the air pressure becomes slightly more than equal to the combined weight of the foot and its load the foot rises slightly from the ground. If the air supply pressure is much greater than the minimum necessary to lift the foot there will be a tendency for the foot to be lifted further off the ground.

This results in an increase in the air flow through the foot and thus a pressure drop through the orifice 19 so that the pressure under the foot is lower than the supply pressure. Thus if there be a light load and high supply pressure which would tend to lift the bell 13 off the ground and let too much air get away the flow is restricted at the orifice 19 and does not become excessive.

While air is supporting its weight, the foot can be moved across the ground with very little friction. When an irregularity in the ground is met, air leaks more quickly from under the foot where the rim is moved away from the ground, the reservoirs 20 and 24 prevent too sudden a fall in pressure when such a leak occurs because a moderate leakage of air for a short time is provided by the air in the reservoirs and does not unduly reduce the pressure in the reservoirs. Any slight loss of pressure is corrected as soon as the foot moves past the irregularity.

Figure 2:
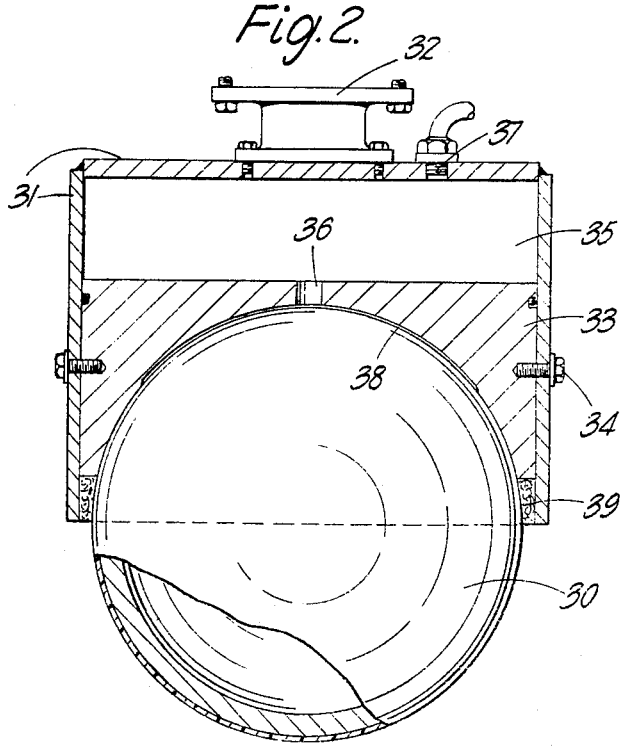
FIGURE 2 is a similar view of an air-lift-foot castor.

FIGURE 2 shows an air lift foot which is supported on a ground engaging ball 30. The foot comprises a circular casing 31 of welded plate material having a mounting flange 32 bolted to the top of the casing. A light alloy casting 33 having a hemispherical recess 38 in its lower end to engage the ball 30 is mounted in the casing by means of screws 34 which pass through the casing 31 into the casting 33. There is a space 35 above the casting 33 which serves as a reservoir and communicates with the recess 38 through an aperture 36. Compressed air is fed to the reservoir through an aperture 37 in the top of the casing 31.

The recess 38 has a broad lower rim machined within very fine limits to the same diameter as the ball, the remainder of the recess being of a slightly larger diameter so as not to contact the ball. The casing 31 extends below the casting 33 and there is a circumferential felt seal 39 within the casing below the casting and pressed against the ball 30. The ball 30 is hollow and made of steel covered in a layer of hard tough plastic such as "Duthane."

The mode of operation of this foot is similar to that of the foot shown in FIGURE 1, but the foot at all times is supported on the smooth ball 30 so that irregularities in the floor surface do not produce air leaks.

When the foot is lifted just clear of the ball by air pressure the device acts as a ball castor with very low friction.

FIGURES 3, 4 and 6 show a reach truck fitted with two driving wheels and two air lift feet. The truck comprises two parallel runners 40, 41 joined together at one end and carrying a battery 42, a platform for an operator (not shown) two electric motors 143, 144 and operating controls 43. A collapsible mast 44 is mounted slidably on the runners 40, 41. The arrangement of two air lift feet 45, 46 and two driving wheels 47, 48 is clearly seen in FIGURE 4 and FIGURE 6. Each of the wheels 47, 48 is connected to a corresponding one of the driving motors 143, 144 which drive each wheel independently and are controlled by the controls 43.

With the air lift feet 45, 46 pressurised, movement of the truck along the ground can be effected by regulating the relative speed of the wheel-driving motors; to travel in a straight line both wheels are driven at the same rate; to effect a turn the wheel at the outside of the turn is driven faster than the inner wheel; to effect a small diameter turn one wheel may be completely stationary or the wheels may be driven in opposite directions.

FIGURE 5 shows a truck frame 60 fitted with three air lift feet 50, 51, 52 supported on balls 53, 54 and 55. An internal combustion engine 56 mounted on the frame 60 drives a compressor 57 which supplies air under pressure to the air-lift-feet through piping 61 by way of a reservoir 58 for the feet 51 and 52 and by way of a reservoir 59 for the foot 50 mounted within the casing of the foot. The frame 60 carries a load carrying platform 62. This truck can be moved across the ground by hand when the feet are lifted by air pressure. When the pressure is cut off there is considerable friction between the feet and the balls, which friction firmly holds the truck in fixed position.

Although the embodiment of FIGURES 3 and 4 has been described with ground engaging air-lift-feet and that of FIGURE 5 with ball engaging air-lift-feet the ground engaging and ball engaging air-lift-feet may be interchanged.

I claim:

An industrial truck comprising a rigid body having parallel driving wheels beneath the body at one end, means for driving the wheels independently at variable speeds, and a support at the other end comprising a foot with a hollow underside, a ground-engaging ball fitting into the hollow of the foot and means to supply pressure-air to the hollow above the ball so that the truck floats on the pressure-air and is readily movable both laterally and forwardly at that end.

References Cited by the Examiner

UNITED STATES PATENTS

| | | | |
|---|---|---|---|
| 1,272,352 | 7/1918 | Allen | 280—158 |
| 2,626,671 | 1/1953 | Hardy et al. | 180—6.66 |
| 2,667,985 | 2/1954 | Woughter | 214—670 |
| 2,740,643 | 4/1956 | Gordon et al. | 280—158 |
| 2,743,787 | 5/1956 | Seck | 180—7 |
| 2,918,183 | 12/1959 | Petersen et al. | 180—7 |
| 2,925,134 | 2/1960 | Cunningham | 180—6.66 |
| 2,938,590 | 5/1960 | Barnett | 180—7 |
| 2,985,114 | 5/1961 | Lindner | 180—7 |
| 3,052,483 | 9/1962 | Petersen | 180—7 |
| 3,082,836 | 3/1963 | Billman | 180—7 |
| 3,097,718 | 7/1963 | Jay et al. | 180—7 |
| 3,174,571 | 3/1965 | Cockerell | 180—7 |
| 3,185,238 | 5/1965 | Coates | 180—7 |

FOREIGN PATENTS

| | | |
|---|---|---|
| 878,818 | 10/1961 | Great Britain. |
| 1,238,499 | 7/1960 | Great Britain. |

A. HARRY LEVY, *Primary Examiner.*